United States Patent
Matsubara

(10) Patent No.: US 9,508,174 B2
(45) Date of Patent: Nov. 29, 2016

(54) DISPLAY DEVICE AND NON-TRANSITORY STORAGE MEDIUM STORING INSTRUCTIONS EXECUTABLE BY THE DISPLAY DEVICE

(71) Applicant: BROTHER KOGYO KABUSHIKI KAISHA, Nagoya-shi, Aichi-ken (JP)

(72) Inventor: Yu Matsubara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/611,568

(22) Filed: Feb. 2, 2015

(65) Prior Publication Data
US 2015/0221115 A1 Aug. 6, 2015

(30) Foreign Application Priority Data
Feb. 3, 2014 (JP) .................................. 2014-018533

(51) Int. Cl.
G06T 11/60 (2006.01)
G06T 19/00 (2011.01)
G06F 3/01 (2006.01)

(52) U.S. Cl.
CPC .............. *G06T 11/60* (2013.01); *G06F 3/011* (2013.01); *G06T 19/006* (2013.01)

(58) Field of Classification Search
CPC .................. G06T 19/006; G06T 2207/30204; G06F 3/011; G06F 3/04815
See application file for complete search history.

(56) References Cited

U.S. PATENT DOCUMENTS

| 8,817,047 B1* | 8/2014 | Lee ......................... G09G 3/003 345/632 |
| 2011/0319130 A1* | 12/2011 | Lee .................... H04M 1/72572 455/556.1 |
| 2012/0008003 A1* | 1/2012 | Lim .......................... G06F 3/14 348/222.1 |
| 2012/0038669 A1* | 2/2012 | Lee ......................... G06F 3/011 345/633 |
| 2012/0195460 A1* | 8/2012 | Lawrence Ashok Inigo ..................... G06T 19/006 382/103 |
| 2015/0117831 A1* | 4/2015 | Hanai ...................... H04N 5/76 386/224 |

FOREIGN PATENT DOCUMENTS

| JP | 2003-256876 A | 9/2003 |
| JP | 2010-219879 A | 9/2010 |
| JP | 2012-63850 A | 3/2012 |

* cited by examiner

*Primary Examiner* — Jeffrey Chow
(74) *Attorney, Agent, or Firm* — Merchant & Gould P.C.

(57) ABSTRACT

A non-transitory storage medium stores instructions executable by a display device including an image taking device and a display. The instructions cause the display device to perform: displaying a real-space image being taken by the image taking device; displaying a content disposed in an augmented reality space and the real-space image in combination, when a marker associated with the content exists in the real-space image; keeping displaying the content, when an instruction for keeping displaying the content is provided with the content being displayed; displaying the content when the instruction is not provided and when the marker exists in the real-space image; and not displaying the content when the instruction is not provided and when the marker does not exist in the real-space image.

12 Claims, 6 Drawing Sheets

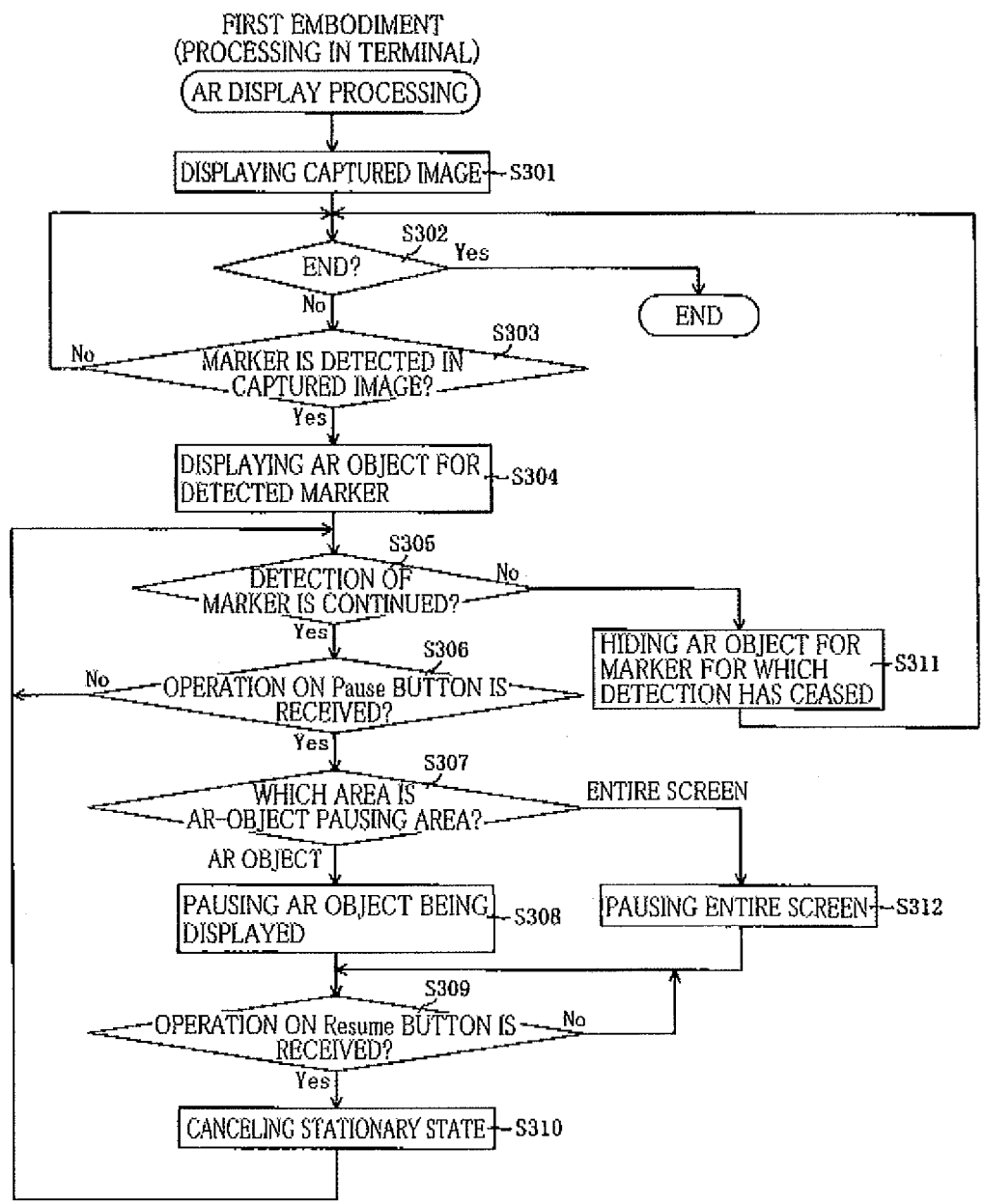

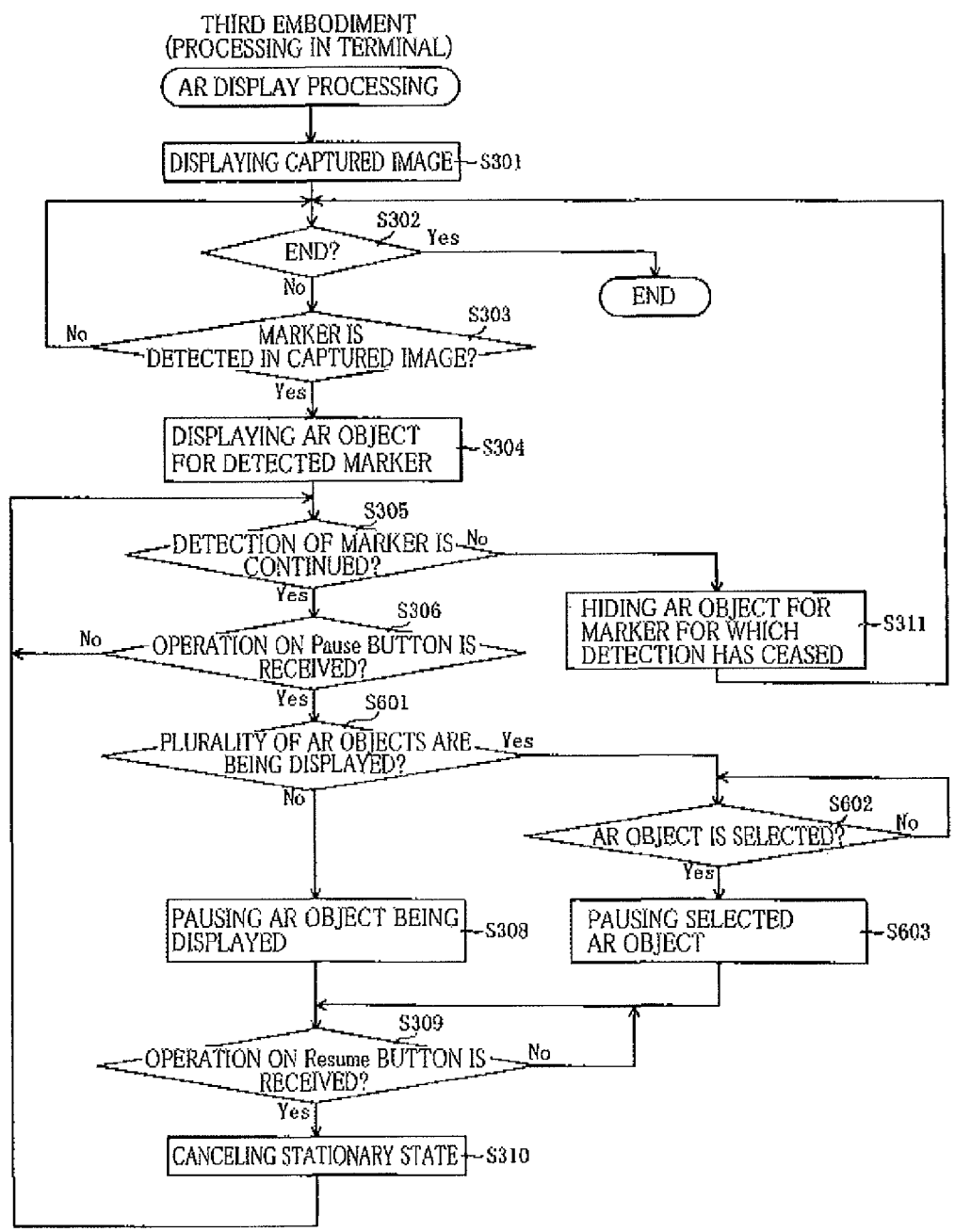

DISPLAY DEVICE AND NON-TRANSITORY STORAGE MEDIUM STORING INSTRUCTIONS EXECUTABLE BY THE DISPLAY DEVICE

CROSS REFERENCE TO RELATED APPLICATION

The present application claims priority from Japanese Patent Application No. 2014-018533, which was filed on Feb. 3, 2014, the disclosure of which is herein incorporated by reference in its entirety.

BACKGROUND

Technical Field

The present invention relates to a display device and a non-transitory storage medium storing a plurality of instructions executable by a computer of the display device.

Description of the Related Art

There is known a technique in which when an image of a marker attached to a subject device is taken by a camera, an image taken by the camera and a help object associated with the marker are combined with each other and displayed using an AR (Augmented Reality) technique.

SUMMARY

In the technique described above, when the image taking of the marker has ceased, the help object disappears. To keep displaying the help object, a user needs to keep taking the image of the marker with the camera. In the case where the user performs operations or works while viewing the help object, however, if the camera is moved, or the marker is hidden by a user's hand, for example, the user cannot take the image of the marker, leading to disappearance of the help object being viewed by the user.

An aspect of the disclosure relates to a display device and a non-transitory storage medium storing a plurality of instructions executable by a computer of the display device, each allowing a user to easily use a content which is combined with an image in a real space and displayed using the AR technique.

In one aspect of the disclosure, a non-transitory storage medium stores a plurality of instructions executable by a computer of a display device including an image taking device and a display. The plurality of instructions, when executed by the computer, cause the display device to perform: controlling the display to display a real-space image which is being taken by the image taking device; determining whether the real-space image taken by the image taking device includes a marker; synthesizing the real-space image and a content associated with the determined marker when it is determined that the real-space image includes the marker; controlling the display to display the real-space image synthesized with the content; receiving an instruction for keeping displaying the content on the display while the real-space image synthesized with the content is displayed on the display; controlling the display to display the real-space image with the synthesized content on the display when the instruction is not received and when the real-space image taken by the image taking device includes the marker; controlling the display to display the real-space image with the synthesized content on the display when the instruction is received and when the real-space image taken by the image taking device does not include the marker; and controlling the display to disappear the content on the display while displaying the real-space image when the instruction is not received and when the real-space image taken by the image taking device does not include the marker.

In another aspect of the disclosure, a display device includes: an image taking device; a display; a processor; and a memory storing a plurality of instructions. The plurality of instructions, when executed by the processor, cause the display device to perform: controlling the display to display a real-space image which is being taken by the image taking device; determining whether the real-space image taken by the image taking device includes a marker; synthesizing the real-space image and a content associated with the determined marker when it is determined that the real-space image includes the marker; controlling the display to display the real-space image synthesized with the content; receiving an instruction for keeping displaying the content on the display while the real-space image synthesized with the content is displayed on the display; controlling the display to display the real-space image with the synthesized content on the display when the instruction is not received and when the real-space image taken by the image taking device includes the marker; controlling the display to display the real-space image with the synthesized content on the display when the instruction is received and when the real-space image taken by the image taking device does not include the marker; and controlling the display to disappear the content on the display while displaying the real-space image when the instruction is not received and when the real-space image taken by the image taking device does not include the marker.

It is noted that the present invention may be achieved in the form of, e.g., the display device, a controller for controlling the display device, a display system, a display method, or the storage medium storing a display program.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 3 is a flow chart illustrating an AR display processing in the first embodiment;

FIG. 6 is a flow chart illustrating an AR display processing in the third embodiment.

DETAILED DESCRIPTION OF THE EMBODIMENTS

Figure 1:
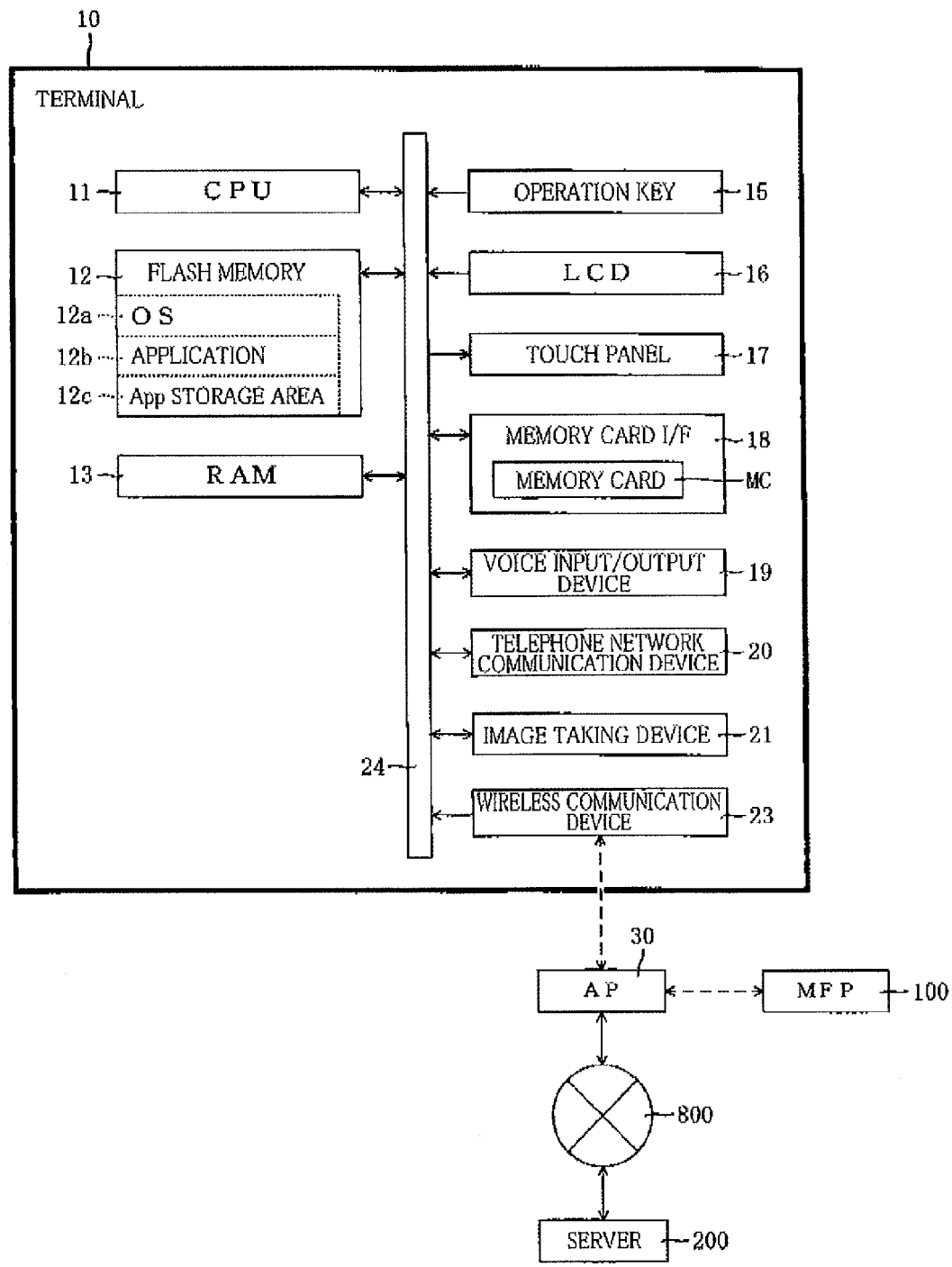
FIG. 1 is a block diagram illustrating an electric configuration of a terminal.

Hereinafter, there will be described embodiments by reference to the drawings. First, a first embodiment will be explained with reference to FIGS. 1-3. FIG. 1 illustrates an electric configuration of a terminal 10 on which is installed an application 12b in one embodiment of a display program. In the present embodiment, the terminal 10 is a mobile device such as a smartphone. The terminal 10 includes a CPU 11, a flash memory 12, a RAM 13, operation keys 15, an LCD 16, a touch panel 17, a memory card interface (hereinafter referred to as "memory card I/F") 18, a voice input/output device 19, a telephone network communication device 20, an image taking device 21, and a wireless communication device 23. These devices are connected to each other, via a bus line 24.

The CPU 11 controls the devices connected to the bus line 24, according to fixed values, programs, and the like stored in the flash memory 12 and other similar storage devices. The flash memory 12 is a rewritable non-transitory memory. The flash memory 12 stores an operating system 12*a* and the application 12*b*. Hereinafter, the operating system may be referred to as "OS". Also, the CPU 11 which executes a program such as the application and the operating system may be hereinafter referred to simply as the name of the program. In the following explanation, for example, the term "application program" or "application" may mean the CPU 11 which executes the application. The OS 12*a* is basic, software for achieving standard functions of the terminal 10. In the present embodiment, the OS 12*a* is an Android® (registered trademark of Google Inc) OS.

The application 12*b* is an application provided by a vendor of the device and installed on the terminal 10 by a user, enabling the user to use various functions of the device from the terminal 10. For example, the application 12*b* allows the user to directly use a printing function and a scanning function of the device from the terminal 10 not via a personal computer (hereinafter may be simply referred to as "PC") or other similar devices.

In the present embodiment, the application 12*b* detects a marker formed on the image taking object based on an image taken by the image taking device 21 and uses the AR technology to display an object for help information corresponding to the detected marker. That is, the application 12*b* displays the object for the help information that overlays a real-space image (which is an image in a real space) actually taken by the image taking device 21. In the present embodiment, the image taking object is a multi-function peripheral (hereinafter referred to as "MFP") 100. The object displayed using the AR display is hereinafter referred to as "AR object". In particular, the application 12*b* in the present embodiment can stop or freeze the AR object being displayed and keep the display even if the image taking device 21 cannot take an image of a marker corresponding to the AR object. Each of processings illustrated in the flow chart in FIG. 3 which will be described below is executed by the CPU 11 according to the application 12*b*.

The flash memory 12 has an App storage area 12*c*. The App storage area 12*c* is a storage area assigned to the application 12*b* for its use. The App storage area 12*c* stores an identification-information management table for managing available marker identification information. The App storage area 12*c* stores images for comparison in association with the marker identification information. Each of the images for comparison is used for specifying a corresponding marker based on the image taken by the image taking device 21. The App storage area 12*e* also stores AR objects in association with the marker identification information. The RAM 13 is a rewritable transitory memory having a temporary area for temporarily storing data when the CPU 11 executes the application 12*b* and the like.

The operation keys 15 are mechanical keys used for inputting instructions to the terminal 10 and are provided on a housing of the terminal 10, for example. The LCD 16 is a liquid crystal display for displaying various screens. The touch panel 17 is superposed on the LCD 16, and a user touches or approaches the touch panel 17 with an input object (e.g., a finger or a stylus) to input instructions to the terminal 10. The memory card I/F 18 is an interface on which, a rewritable non-transitory memory card MC can be mounted. The memory card I/F 18 controls writing and reading of data on and from the memory card MC. The voice input/output device 19 is a voice input/output device including a microphone and a speaker. The telephone network communication device 20 is a circuit for voice conversation over a mobile phone network, not shown.

The image taking device 21 is a camera capable of taking movie images and including an image pickup element such as a CCD (Charge Coupled Device) or a CMOS (Complementary Metal Oxide Semiconductor). In the present embodiment, the image taking device 21 is disposed on a back surface of the housing of the terminal 10, i.e., on a surface thereof which is a back side from a surface thereof on which the LCD 16 is provided.

The wireless communication device 23 is an interface for wireless communication over a wireless LAN. In the present embodiment, the wireless LAN communication device 23 is configured to perform wireless communication over a wireless LAN according to the IEEE802.11b/g/n standard. More specifically, the wireless communication performed by the wireless LAN communication device 23 is a wireless communication according to the Wi-Fi® (registered trademark of Wi-Fi Alliance.) standard (i.e., what is called Wi-Fi communication). In the present embodiment, the wireless communication device 23 is connected to the MFP 100 via an access point (hereinafter may be referred to as "AP") 30 as a relay device.

The AP 30 is a relay device for relaying the Wi-Fi communication. The AP 30 has a broadband router function and can be connected to Internet 800. Thus, the terminal 10 can be communicably connected to various external devices such as a server 200 via the AP 30 and the Internet 800.

Figure 2A:
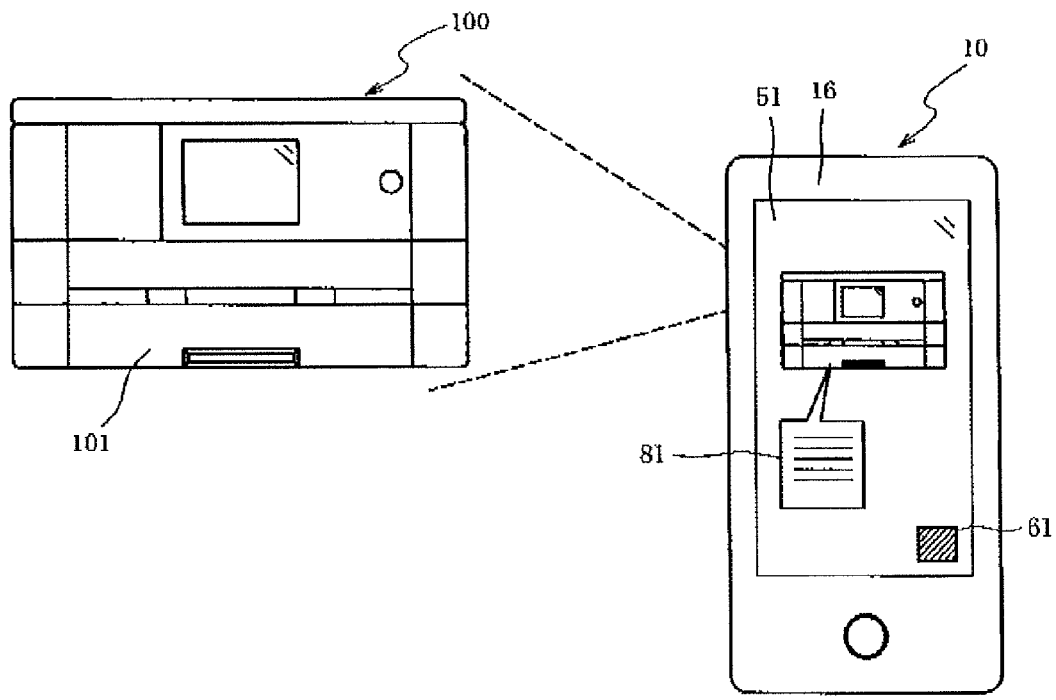
FIGS. 2A and 2B are views for schematically explaining operations in a first embodiment.
Figure 2B:
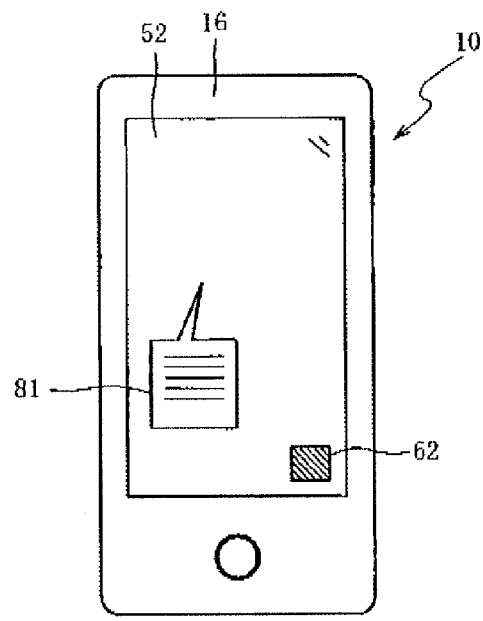

There will be next explained operations in the first embodiment with reference to FIGS. 2A and 2B. As illustrated in FIG. 2A, in the case where an image of a front face of the MFP 100 is taken by the image taking device 21 of the terminal 10, the application 12*b* detects a sheet-supply tray 101 as a marker based on image matching between the image taken by the image taking device 21 and the comparison image stored in the App storage area 12*c*. The application 12*b* controls the LCD 16 to display an image on which an AR object 81 for help information corresponding to the detected marker overlays a captured image 51 which is a real-space image taken by the image taking device 21 (in the example illustrated in FIG. 2A, an image taken from a front side of the MFP 100). In other words, the application 12*b* controls the LCD 16 to display an image obtained by combining the AR object 81 and the captured image 51 with each other. In this specification, the captured image is an image displayed on the LCD 16 at a time among moving real-space images each taken by the image taking device 21 and displayed on the LCD 16 while changing every moment.

When the AR object 81 is displayed, the application 12*b* displays a Pause button 61 at a lower right portion of the screen. The Pause button 61 is for instructing a pause or a stop of movement of the AR object 81 being displayed, that is, the Pause button 61 is for instructing stationarily keeping of the display. When a touch operation (what is called a tapping operation) is performed on the Pause button 61, the application 12*b* freezes the display of the AR object 81. In the case where the display of the AR object 81 is paused, even when detection of a marker corresponding to the AR object 81 has ceased, that is, even when the AD object 81 becomes out of the display region of the LCD 16, the application 12b keeps displaying the AR object 81 without causing a stationary AR object 81 to disappear.

Accordingly, the stationary AR object 81 is kept displayed without disappearing, even in the case where the Pause button 61 is operated in the state illustrated in FIG. 2A, thereafter the MFP 100 falls outside an image taking area of the image taking device 21, and consequently as illustrated in FIG. 2B an image taken by the image taking device 21 is a captured image 52 not including the marker corresponding to the AR object 81 being in a stationary displaying state (may be referred to as "stationary AR object 81"), for example. Thus, the user can view the AR object 81 without continuing taking the marker.

When the display of the AR object 81 is paused, the application 12b displays a Resume button 62 instead of the Pause button 61. The Resume button 62 is for, instructing a cancel of the stationary displaying state of the AR object 81. When a touch operation is performed on the Resume button 62, the application 12b cancels the stationary displaying state of the AR object 81. As a result, the AR object 81 is hidden while the marker corresponding to the AR object 81 whose stationary displaying state has been canceled is not detected after the Resume button 62 is operated.

FIG. 3 is a flow chart illustrating an AR display processing. This processing begins when the CPU 11 receives an operation for requesting a display of help information using the AR display during operation of the application 12b. The CPU 11 at S301 starts controlling the image taking device 21 to take an image in the real space and displays a captured image on the LCD 16. With this processing, images in the real space (more specifically, moving images) taken by the image taking device 21 are sequentially displayed as the captured images on the LCD 16 until the present processing is finished.

When a predetermined quitting operation is received by the CPU 11 (S302: Yes), this flow ends. When the predetermined quitting operation is not received by the CPU 11 (S302: Yes), the CPU 11 at S303 determines whether a marker has been detected in the captured image or not based on image matching between the captured image and the comparison image. When the marker is not detected (S303: No), this flow returns to S302.

When a marker is detected (S303: Yes), the CPU 11 at S304 refers to the App storage area 12c to display an AR object corresponding to the detected marker. A display location of the AR object is determined based on display location information stored in the App storage area 12c in association with the marker and based on information including a location and an inclination of the marker in the captured image. Upon displaying the AR object at S304, the CPU 11 controls the LCD 16 to display a Pause button, e.g., the Pause button 61 illustrated in FIG. 2A.

The CPU 11 at S305 determines whether the detection of the marker corresponding to the AR object displayed at S304 is continued or not based on the image matching between the captured image and the comparison image. When the marker is not detected (S305: No), the CPU 11 at S311 hides the AR object corresponding to the marker for which the detection has ceased, and this flow returns to S302.

When the marker is continuously detected (S305: Yes), the CPU 11 at S306 determines whether an operation on the Pause button displayed on the LCD 16 has been received or not. It is noted that when a positive decision is made at S305, the CPU 11 changes the display location of the AR object as needed according to changes in e.g., the location and inclination of the marker in the captured image.

When the operation on the Pause button is not received by the CPU 11 (S306: No), this flow returns to S305. When the operation on the Pause button is received by the CPU 11 (S306: Yes), the CPU 11 at S307 determines which area is an AR-object pausing area. The application 12b in the present embodiment is configured in advance to be capable of selecting one of (a) only the AR object on the entire screen (image) being displayed and (b) the entire screen being displayed, as the AR-object pausing area. The selected AR-object pausing area is stored into the App storage area 12c, and the CPU 11 executes the determination at S307 based on the contents stored in the App storage area 12c. Thus, the CPU 11 can selectively use one of the different AR-object pausing areas based on the contents stored in the App storage area 12c.

When the CPU 11 determines that the AR-object pausing area is only the AR object (S307: AR OBJECT), the CPU 11 at S308 pauses the AR object being displayed. That is, the display location of the AR object being displayed is fixed in the display region of the LCD 16 and is not changed depending upon information such as the location and inclination of the marker in the captured image. When the CPU 11 determines that the AR-object pausing area is the entire screen being displayed, (S307: ENTIRE SCREEN), the CPU 11 at S312 pauses the screen being displayed, i.e., the screen containing the AR object. It is noted that upon pausing the AR object at S308 or S312, the CPU 11 controls the LCD 16 to display the Resume button, e.g., the Resume button 62 illustrated in FIG. 2B.

After the processing at S308 or S312, the CPU 11 at S309 determines whether an operation on the Resume button displayed on the LCD 16 has been received or not. When the operation on the Resume button is not received by the CPU 11 (S309: No), the CPU 11 waits for the operation on the Resume button.

It is noted that since the image taking of the image taking device 21 which is started at S301 is being continued, when the AR-object pausing area is only the AR object, the CPU 11 displays the captured image taken by the image taking device 21, on an area (as one example of a second area) on the LCD 16 which differs from an area (as one example of a first area) on which the AR object is displayed. Thus, the user can look for the next marker while viewing the captured image displayed on the LCD 16.

When the operation on the Resume button is received by the CPU 11 (S309: Yes), the CPU 11 at S310 cancels the stationary displaying state of the AR object, and this flow goes to S305. With this processing, the stationary displaying state of the stationary AR object can be canceled as needed by the operation on the Resume button.

When the stationary displaying state of the AR object is canceled at S310, and the detection of the marker corresponding to the AR object ceases, a negative decision is made at S305, and the CPU 11 executes the processing at S311. That is, when detection of the marker corresponding to the stationary AR object ceases after a cancel of its stationary displaying state, the marker is hidden.

In the above-described first embodiment, in the case where the operation on the Pause button is received by the CPU 11 as a keeping instruction during display of the AR object, the display of the AR object is continued even after detection of the marker corresponding to the stationary AR object has ceased. This configuration allows the user to view the AR object without continuing taking an image of the marker.

Figure 4:
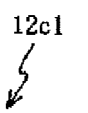
FIG. 4 is a schematic view illustrating one example of contents of a display-order management table.
Figure 5:
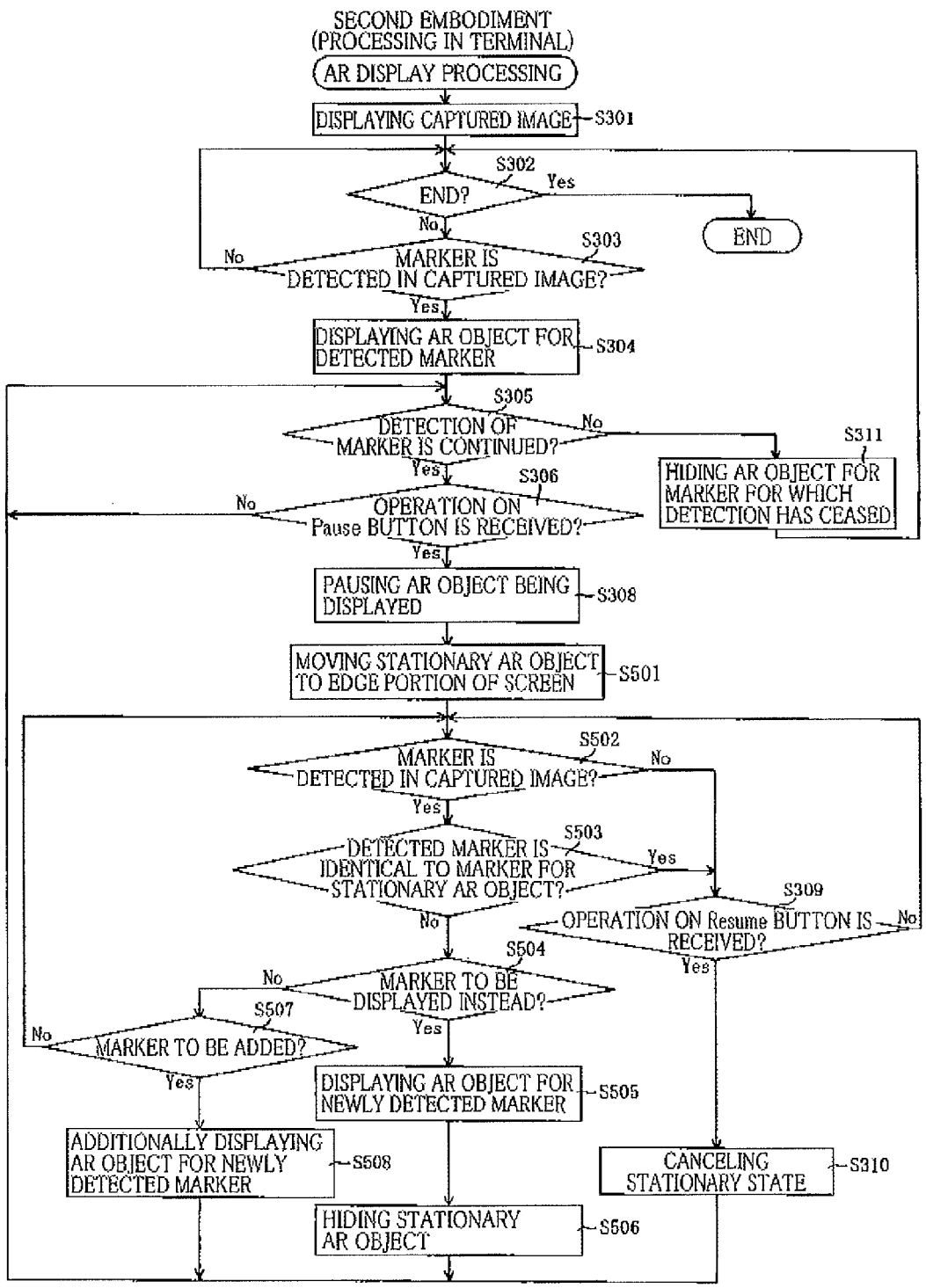
FIG. 5 is a flow chart illustrating an AR display processing in the second embodiment.

There will be next explained a second embodiment with reference to FIGS. 4 and 5. In this second embodiment, the CPU 11 considers a display order of a plurality of AR objects which is not considered in the first embodiment. It is noted that the same reference numerals as used in the first embodiment are used to designate the corresponding elements of this second embodiment, and an explanation of which is dispensed with. Hereinafter, a configuration specific to this second embodiment will be mainly explained.

FIG. 4 is a schematic view illustrating one example of contents of a display-order management table 12c1. The display-order management table 12c1 stored in the App storage area 12c is a table for managing a display order of a plurality of AR objects which should be displayed sequentially. In the display-order management table 12c1, condition marker identification information 12c1b and an additional-display object flag 12c1c are associated with each set of detected marker identification information 12c1a.

A marker identified by the identification information 12c1b, i.e., condition marker is a specific marker which is conditional to display of an AR object corresponding to a marker identified by the identification information 12c1a in the case where the marker is detected.

In the present embodiment, in the case where the marker identified by the identification information 12c1a has been detected, when an AR object corresponding to a condition marker identified by the identification information 12c1b corresponding to the identification information 12c1a is in the stationary displaying state, the CPU 11 displays an AR object corresponding to the detected marker.

In the example illustrated in FIG. 4, for example, in the case where the identification information 12c1a is a marker B, a marker A is stored as the identification information 12c1b corresponding to the identification information 12c1a. In this case, in the case where the marker B has been detected, when an AR object corresponding to the marker A is in the stationary displaying state, an AR object corresponding to the detected marker B is displayed.

It is noted that in the case where there is no condition for displaying the AR object corresponding to the detected marker, "0" is stored as the identification information 12c1b. In the example illustrated in FIG. 4, for example, in the case where the identification information 12c1a is the marker A, "0" is stored as the identification information 12c1b corresponding to the identification information 12c1a. In this case, in the case where the marker A has been detected, the AR object corresponding to the marker A is displayed unconditionally.

The additional-display object flag 12c1c is a flag indicating whether or not the AR object corresponding to the marker identified by the identification information 12c1a is an object to be additionally displayed. In the case where "1" is set for the additional-display object flag 12c1c, this state of the additional-display object flag 12c1c indicates that the AR object corresponding to the marker identified by the identification information 12c1a is an object to be additionally displayed. In the case where "0" is set for the additional-display object flag 12c1c, this state of the additional-display object flag 12c1c indicates that the AR object corresponding to the marker identified by the identification information 12c1a is not an object to be additionally displayed.

In the case where the additional-display object flag 12c1c is 1, an AR object corresponding to a marker identified by the identification information 12c1a corresponding to the additional-display object flag 12c1c is displayed in addition to a stationary AR object, i.e., an AR object corresponding to a: marker identified by the identification information 12c1b. In the case where the additional-display object flag 12c1c is 0, the AR object corresponding to the marker identified by the identification information 12c1a corresponding to the additional-display object flag 12c1c is displayed instead of the stationary AR object.

FIG. 5 is a flow chart illustrating an AR display processing in the second embodiment. This processing is executed by the CPU 11 of the terminal 10 according to the application 12b in the second embodiment. This processing begins when the CPU 11 receives an operation for requesting a display of help information using the AR display dining operation of the application 12b as in the first embodiment.

When a positive decision (Yes) is made at S303 (S303: Yes), the CPU 11 at S304 displays the AR object corresponding to the detected marker. In the present embodiment, the CPU 11 at S304 displays the AR object corresponding to the detected marker regardless of the contents of the display-order management table 12c1.

When a positive decision (Yes) is made at S306 (S306: Yes), the CPU 11 at S308 pauses the AR object being displayed and at S501 moves the stationary AR object to an edge portion of the screen of the LCD 16, e.g., a lower left edge portion thereof. With this processing, the stationary AR object is kept displayed on a periphery portion of the LCD 16, whereby an area on the LCD 16 which is located near the center of the LCD 16 can be used as an area for displaying a captured image taken by the image taking device 21. This configuration can prevent the stationary AR object from deteriorating viewability of a main portion of the captured image, allowing the user to easily look for the next marker while viewing the captured image displayed on the LCD 16.

As in the processing at S303, the CPU 11 at S502 determines whether a marker has been detected in the captured image or not. When no marker is detected (S502: No), this flow goes to S309.

When a marker is detected (S502: Yes), the CPU 11 at S503 determines whether the marker newly detected is identical to the marker corresponding to the stationary AR object or not. When these markers are identical to each other (S503: Yes), this flow goes to S309. In this case, the display of the stationary AR object is kept, and the AR object corresponding to the detected marker is not newly displayed. Accordingly, an overlap of displays of the same AR, object is avoided, preventing deterioration of viewability of the AR object.

When the markers are not identical to each other (S503: No), the CPU 11 at S504 refers to the display-order management table 12c1 to determine whether or not the marker newly detected is a marker to be displayed instead of the displayed marker. Specifically, a positive decision (Yes) is made at S504 in the case where the marker identified by the identification information 12c1b corresponding to the newly-detected marker identification information 12c1a is the marker corresponding to the stationary AR object, and the additional-display object flag 12c1c corresponding to the identification information 12c1 a is 0. In the other cases, a negative decision (No) is made at S504.

When a positive decision (Yes) is made at S504 (S504: Yes), the CPU 11 at S505 displays an AR object corresponding to the newly detected marker at a display location determined as in the processing at S304. The CPU 11 at S506 hides the stationary AR object, and this flow returns to S305. In this case, the AR object corresponding to the newly detected marker is displayed on the LCD 16 instead of the stationary AR object.

When a negative decision is made at S504 (S504: No), the CPU 11 at S507 refers to the display-order management table 12c1 to determine whether the newly detected marker is a marker to be added. Specifically, a positive decision is made at S507 in the case where the marker identified by the identification information 12c1b corresponding to the newly-detected marker identification information 12c1a is the marker corresponding to the stationary AR object, and the additional-display object flag 12c1c corresponding to the identification information 12c1a is 1. In the other cases, a negative decision (No) is made at S507.

When a positive decision is made at S507 (S507: Yes), the CPU 11 at S508 additionally displays the AR object corresponding to the newly detected marker. That is, the CPU 11 displays the AR object corresponding to the newly detected marker without hiding the stationary AR object. It is noted that a display location of the AR object corresponding to the newly detected marker is determined as in the processing at S304.

When a negative decision (No) is made at S507, that is, when the marker corresponding to the stationary AR object is not a condition marker for the newly detected marker (S507: No), this flow goes to S502. In this case, the display of the stationary AR object is kept, and the AR object corresponding to the newly detected marker is not displayed.

In the above-described second embodiment, the AR objects can be displayed in the display order according to the contents stored in the display-order management table 12c1. Thus, in the case where a series of help information are constituted by a plurality of AR objects, the series of the help information can be displayed in the right order.

The AR object corresponding to the newly detected marker can be displayed instead of the stationary AR object, thereby preventing deterioration of viewability of the AR object corresponding to the newly detected marker.

The CPU 11 can not only display the AR object corresponding to the newly detected marker instead of the stationary AR object but also additionally display the AR object corresponding to the newly detected marker, allowing the user to easily understand a series of help information.

There will be next explained a third embodiment with reference to FIG. 6. In this third embodiment, the CPU 11 considers a case where a plurality of markers are detected at the same time, which case is not considered in the first embodiment. It is noted that the same reference numerals as used in the first embodiment are used to designate the corresponding elements of this third embodiment, and an explanation of which is dispensed with. Hereinafter, a configuration specific to this third embodiment will be mainly explained.

FIG. 6 is a flow chart illustrating an AR display processing in the third embodiment. This processing is executed by the CPU 11 of the terminal 10 according to the application 12b in the third embodiment. This processing begins when the CPU 11 receives an operation for requesting a display of help information using the AR display during operation of the application 12b as in the first embodiment.

When a positive decision (Yes) is made at S303 (S303: Yes), the CPU 11 at S304 displays the AR object corresponding to the detected marker. In the present embodiment, in the case where a plurality of markers have been detected, the CPU 11 displays AR objects respectively corresponding to the detected markers.

When a positive decision (Yes) is made at S306 (S306: Yes), the CPU 11 at S601 determines whether a plurality of AR objects are being displayed or not. When a plurality of AR objects are not being displayed, that is, one AR object is being displayed (S601: No), the CPU 11 at S308 pauses the display of the one AR object, and this flow goes to S309.

When a plurality of AR objects are being displayed (S601: Yes), the CPU 11 waits for selection of one of the AR object being displayed (S602: No). In the present embodiment, in the case where a plurality of AR objects are being displayed, the CPU 11 displays a screen for selecting an AR object, upon receiving an operation on the Pause button. When a selecting operation is performed on the screen, the CPU 11 accepts selection for the one AR object.

When the CPU 11 accepts the selection for the one AR object (S602: Yes), the CPU 11 at S603 pauses the selected AR object, and this flow goes to S309.

In the above-described third embodiment, in the case where a plurality of AR objects being displayed when the operation on the Pause button is performed, one of the AR objects can be selected as an object to be paused, thereby pausing only the AR object to be paused. This configuration allows the user to easily view necessary information.

In the above-described embodiments, the application 12b is one example of the display program. The terminal 10 is one example of a display device. The CPU 11 is one example of a computer. The LCD 16 is one example of a display. The image taking device 21 is one example of an image taking device. The flash memory 12 is one example of a storage. The identification information 12c1b is one example of first information. The additional-display object flag 12c1e is one example of second information. The AR object 81 is one example of a content associated with a marker.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

For example, while the terminal 10 such as a smartphone is used as the display device on which the application 12b is installed in the above-described embodiments, various devices may be used as the display device as long as each of the devices has a structure equivalent to the image taking device 21. For example, a device such as a tablet computer or a laptop computer has the structure equivalent to the image taking device 21, the device may be employed as the display device on which the application 12b is installed. Also, a digital camera may be employed as the display device on which the application 12b is installed. While the OS 12a of the terminal 10 is the Android OS in the above-described embodiments, another OS may be employed.

In the above-described embodiments, the CPU 11 of the terminal 10 detects the marker on the captured image. That is, the CPU 11 is one example of a detector in the above-described embodiments. Instead of this configuration, the terminal 10 may be configured to transmit the captured image to the server 200, and the server 200 may detect the marker on the captured image. In this modification, the server 200 is one example of the detector. Also, the AR objects are stored in the App storage area 12c in the above-described embodiments. Instead of this configuration, the AR objects may be stored in the server 200, and at least one AR object may be retrieved from the server 200 according to the detected marker.

In the above-described first embodiment, when the operation on the Pause button is performed, at least one of the AR objects being displayed and the entire screen containing the AR object is paused, the present disclosure is not limited to this configuration. For example, the AR object may be moved on the display region as long as at least one of the AR objects is being displayed on the display region of the LCD 16. The AR object may be moved according to the location of the marker on the captured image. For example, by displaying the AR object at any position on the display region of the LCD 16 even if the marker falls outside the captured image, the AR object can be continuously displayed on the LCD 16. Since the AR object is continuously displayed on the LCD 16, the user can continuously view the AR object.

While the AR-object pausing area is selected to one of only the AR object and the entire screen being displayed in the above-described first embodiment, only one of them may be employed. Also, while the AR-object pausing area is selected based on the contents stored in the App storage area 12*c*, the AR-object pausing area may be selected after the operation on the Pause button.

In the above-described second embodiment, when the operation on the Pause button is performed, the stationary AR object is moved to an edge portion of the screen. However, in the case where the AR-object pausing area is the entire screen, the entire screen containing the stationary AR object may be reduced in size and displayed on an edge portion of the screen.

In the above-described second embodiment, the detected marker identification information 12*c*1*a* and the condition marker identification information 12*c*1*b* are associated with each other in the display-order management table 12*c*1 to determine the display order of the AR objects. However, the display order of the AR objects may be determined in another manner. For example, information about numeric values for specifying the display order may be associated with available markers.

In the above-described third embodiment, in the case where the plurality of AR objects are being displayed when the operation on the Pause button is performed, the user selects one of the AR objects. Instead of this configuration, information capable of specifying an AR object to be selected as an object to be paused, among AR objects respectively corresponding to markers which can be detected at the same time may be stored in the App storage area 12*c* in advance, and the CPU 11 may select one AR object based on the contents stored in the App storage area 12*c*. Examples of the information capable of specifying the AR object to be selected as the object to be paused include identification information for the marker previously detected. Also, after all the AR objects are paused, unnecessary AR objects may be deleted by a predetermined operation.

The number of selectable AR objects is not limited to one, and a plurality of AR objects may be selected. In this modification, for example, an upper limit value for selection is set, and any number of AR objects may be selected as objects to be paused as long as the number is less than or equal to the upper limit value.

While the marker is detected based on image matching between the image taken by the image taking device 21 and the comparison image stored in the App storage area 12*c* in the above-described embodiments, marks such as two-dimensional codes and text information attached to the MFP 100 may be used each as the marker. In this modification, in the case where the two-dimensional code is taken by the image taking device 21, the CPU 11 determines that the marker is detected, and an AR object corresponding to information stored in the two-dimensional code is displayed, for example.

While the CPU 11 executes the processings illustrated in FIGS. 3, 5, and 6 in the above-described embodiments, a plurality of CPUs may cooperate to execute the processings. One or more ICs such as ASICs may execute the processings alone or in combination. Also, the CPU 11 and the IC such as the ASIC may cooperate to execute the processings. Some of the processings illustrated in FIGS. 3, 5, and 6 may be omitted or changed without departing from the spirit and scope of the disclosure. The features in the above-described embodiments and the above-described modifications may be embodied as needed in combination.

What is claimed is:

1. A non-transitory storage medium storing a plurality of instructions executable by a computer of a display device comprising an image taking device and a display, the plurality of instructions, when executed by the computer, causing the display device to perform:
controlling the display to display a real-space image which is being taken by the image taking device;
determining whether the real-space image taken by the image taking device includes a marker;
synthesizing the real-space image and a content associated with the determined marker when it is determined that the real-space image includes the marker;
controlling the display to display the real-space image synthesized with the content;
controlling the display to display a content-display keeping button in a state in which the real-space image synthesized with the content is displayed on the display, the content-display keeping button being configured to, when operated, keep the content displayed on the display;
controlling the display to display the real-space image with the synthesized content on the display such that the content is kept displayed on the display, when the content-display keeping button displayed on the display is operated in the state in which the real-space image synthesized with content is displayed on the display and when the real-space image taken by the image taking device includes the marker;
controlling the display to display the real-space image with the synthesized content on the display when the content-display keeping button displayed on the display is not operated in the state in which the real-space image synthesized with the content is displayed on the display and when the real-space image taken by the image taking device includes the marker;
controlling the display to display the real-space image with the synthesized content on the display such that the content is kept displayed on the display, when the content-display keeping button displayed on the display is operated in the state in which the real-space image synthesized with the content is displayed on the display and when the real-space image taken by the image taking device does not include the marker; and
controlling the display to disappear the content on the display while displaying the real-space image when the content-display keeping button displayed on the display is not operated in the state in which the real-space image synthesized with the content is displayed on the display and when the real-space image taken by the image taking device does not include the marker.

2. The non-transitory storage medium according to claim 1, wherein when the content-display keeping button displayed on the display is operated and when the real-space image taken by the image taking device does not include the marker, the content is displayed in a first region of the display and the real-space image is displayed in a second region of the display, the second region being different from the first region.

3. The non-transitory storage medium according to claim 1, wherein when the content-display keeping button displayed on the display is operated and when the real-space image taken by the image taking device does not include the marker, the content is displayed in a peripheral region of the display.

4. The non-transitory storage medium according to claim 1, wherein when the content-display keeping button displayed on the display is operated and when the real-space image taken by the image taking device does not include the marker, the real-space image is disappeared on the display while the content is displayed on the image.

5. The non-transitory storage medium according to claim 1, wherein when the content-display keeping button displayed on the display is operated, when the real-space image taken by the image taking device does not include the marker, when the content is displayed on the display and when it is determined that the real-space image includes another marker, the content is disappeared on the display.

6. The non-transitory storage medium according to claim 5,
wherein the display device further comprises a storage configured to store first information indicating a display order of a plurality of contents with which a plurality of markers each as the marker are respectively associated, and
wherein when executed by the computer, the plurality of instructions cause the display device to perform:
when it is determined that the real-space image includes another marker while the content is displayed on the display based on an operation on the content-display keeping button, determining, based on the first information, whether a content corresponding to the another marker is to be displayed following the content being displayed;
disappearing the content being displayed, when it is determined that the content corresponding to the another marker is to be displayed following the content being displayed; and
keeping displaying the content being displayed, when it is determined that the content corresponding to the another marker is not to be displayed following the content being displayed.

7. The non-transitory storage medium according to claim 5,
wherein the display device further comprises a storage configured to store second information indicating whether each of a plurality of contents with which a plurality of markers each as the marker are respectively associated is a content to be displayed on the display in addition to the content being displayed, and
wherein when executed by the computer, the plurality of instructions cause the display device to perform:
when it is determined that the real-space image includes another marker while the content is displayed on the display based on an operation on the content-display keeping button, determining, based on the second information, whether a content corresponding to the another marker is to be displayed in addition to the content being displayed; and
displaying the content corresponding to the another marker in addition to the content being displayed, when it is determined that the content corresponding to the another marker is to be displayed in addition to the content being displayed.

8. The non-transitory storage medium according to claim 5, wherein when executed by the computer, the plurality of instructions cause the display device to perform:
when it is determined that the real-space image includes another marker while the content is displayed on the display based on an operation on the content-display keeping button, determining whether the another marker is identical to the marker associated with the content being displayed;
disappearing the content being displayed, when it is determined that the another marker is not identical to the marker associated with the content being displayed; and
keeping displaying the content being displayed without displaying a content corresponding to the another marker, when it is determined that the another marker is identical to the marker associated with the content being displayed.

9. The non-transitory storage medium according to claim 1, wherein when executed by the computer, the plurality of instructions cause the display device to perform:
selecting at least one of a plurality of contents when the content-display keeping button displayed on the display is operated while the plurality of contents are being displayed on the display;
keeping displaying the selected contents on the display; and
disappearing the plurality of contents other than the selected contents on the display.

10. The non-transitory storage medium according to claim 1,
wherein the content-display keeping button is configured to, when operated, cause the display to display an image at least comprising the content, in a stationary state, and
wherein when executed by the computer, the plurality of instructions cause the display device to cancel the stationary state of the image at least comprising the content, when an instruction for canceling the stationary state of the image is provided in a state in which the image is being displayed in the stationary state.

11. The non-transitory storage medium according to claim 1, wherein when executed by the computer, the plurality of instructions cause the display device to display the real-space image and the synthesized content on the display in a stationary state, when the content-display keeping button displayed on the display is operated in a state in which the real-space image and the synthesized content are displayed on the display and when the real-space image taken by the image taking device includes the marker.

12. A display device comprising: an image taking device; a display; a processor; and a memory storing a plurality of instructions, the plurality of instructions, when executed by the processor, causing the display device to perform:
controlling the display to display a real-space image which is being taken by the image taking device;
determining whether the real-space image taken by the image taking device includes a marker;
synthesizing the real-space image and a content associated with the determined marker when it is determined that the real-space image includes the marker;
controlling the display to display the real-space image synthesized with the content;
controlling the display to display a content-display keeping button in a state in which the real-space image synthesized with the content is displayed on the display, the content-display keeping button being configured to, when operated, keep the content displayed on the display;

controlling the display to display the real-space image with the synthesized content on the display such that the content is kept displayed on the display, when the content-display keeping button displayed on the display is operated in the state in which the real-space image synthesized with the content is displayed on the display and when the real-space image taken by the image taking device includes the marker;

controlling the display to display the real-space image with the synthesized content on the display when the content-display keeping button displayed on the display is not operated in the state in which the real-space image synthesized with the content is displayed on the display and when the real-space image taken by the image taking device includes the marker;

controlling the display to display the real-space image with the synthesized content on the display such that the content is kept displayed on the display, when the content-display keeping button displayed on the display is operated in the state in which the real-space image synthesized with the content is displayed on the display and when the real-space image taken by the image taking device does not include the marker; and controlling the display to disappear the content on the display while displaying the real-space image when the content-display keeping button displayed on the display is not operated in the state in which the real-space image synthesized with the content is displayed on the display and when the real-space image taken by the image taking device does not include the marker.

* * * * *

UNITED STATES PATENT AND TRADEMARK OFFICE
CERTIFICATE OF CORRECTION

PATENT NO.       : 9,508,174 B2
APPLICATION NO.  : 14/611568
DATED            : November 29, 2016
INVENTOR(S)      : Yu Matsubara It is certified that error appears in the above-identified patent and that said Letters Patent is hereby corrected as shown below:

In Claim 1:
Column 12, Line 33: After "with" insert -- the --.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*